United States Patent
Gysling et al.

(10) Patent No.: US 8,402,840 B2
(45) Date of Patent: Mar. 26, 2013

(54) ULTRASONIC FLUID FLOW METER HOUSING WITH ACOUSTICALLY MATCHED BASE

(75) Inventors: Daniel L. Gysling, Glastonbury, CT (US); ChangJiu Dang, Wallingford, CT (US)

(73) Assignee: Expro Meters, Inc., Wallingford, CT (US)

( * ) Notice: Subject to any disclaimer, the term of this patent is extended or adjusted under 35 U.S.C. 154(b) by 319 days.

(21) Appl. No.: 12/797,383

(22) Filed: Jun. 9, 2010

(65) Prior Publication Data

US 2010/0307263 A1 Dec. 9, 2010

Related U.S. Application Data

(60) Provisional application No. 61/185,459, filed on Jun. 9, 2009.

(51) Int. Cl.
*G01F 1/66* (2006.01)
(52) U.S. Cl. .................................. 73/861.25; 73/861.27
(58) Field of Classification Search .................. None
See application file for complete search history.

(56) References Cited

U.S. PATENT DOCUMENTS

| | | | | |
|---|---|---|---|---|
| 3,987,674 A | * | 10/1976 | Baumoel | 73/861.28 |
| 4,665,750 A | * | 5/1987 | Rogers | 73/587 |
| 6,062,091 A | * | 5/2000 | Baumoel | 73/861.27 |
| 6,349,599 B1 | | 2/2002 | Lynnworth et al. | |
| 6,895,825 B1 | * | 5/2005 | Barkhoudarian | 73/861.28 |
| 7,703,337 B1 | * | 4/2010 | Feller | 73/861.27 |
| 2004/0254469 A1 | | 12/2004 | Shkarlet et al. | |
| 2008/0236297 A1 | | 10/2008 | Fleet et al. | |
| 2009/0025487 A1 | | 1/2009 | Gysling et al. | |
| 2009/0255345 A1 | * | 10/2009 | Gysling | 73/861.25 |

FOREIGN PATENT DOCUMENTS

| | | |
|---|---|---|
| EP | 1703261 | 9/2006 |
| JP | 2008267848 | 11/2008 |

* cited by examiner

*Primary Examiner* — Harshad R Patel
(74) *Attorney, Agent, or Firm* — O'Shea Getz PC

(57) ABSTRACT

A device for sensing fluid flow within a pipe, which pipe has a pipe wall, is provided. The device includes a sensor housing and a fluid flow meter. The sensor housing includes at least one pressure vessel enclosure and hardware for mounting the enclosure on an exterior surface of the pipe wall. The enclosure includes a base, side walls, and a cap. The enclosure base has a pipe-side surface that mates with the exterior surface of the pipe wall. The enclosure base and the pipe wall have substantially similar resonant frequencies and acoustic impedance. The sensor housing is adapted to be attached to the pipe wall such that the pipe-side surface of the base is mated with the exterior surface of the pipe wall. The fluid flow meter includes a plurality of ultrasonic sensors disposed within the at least one pressure vessel enclosure. Each sensor has a transmitter and a receiver. The transmitters are adapted to transmit signals at one or more frequencies, including frequencies that are substantially equal to the resonant frequencies of the base and pipe wall.

13 Claims, 2 Drawing Sheets

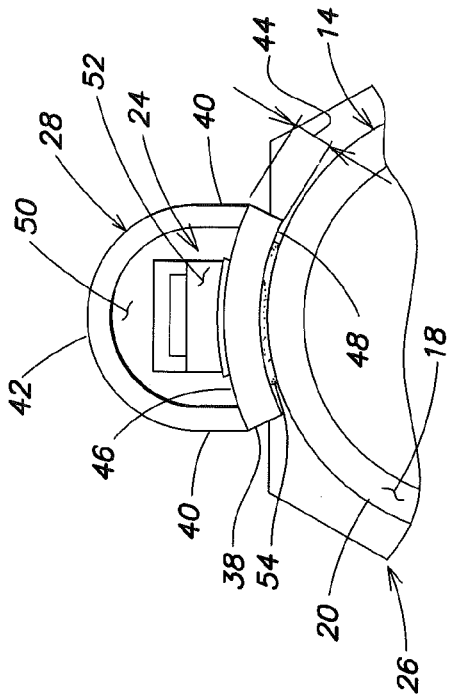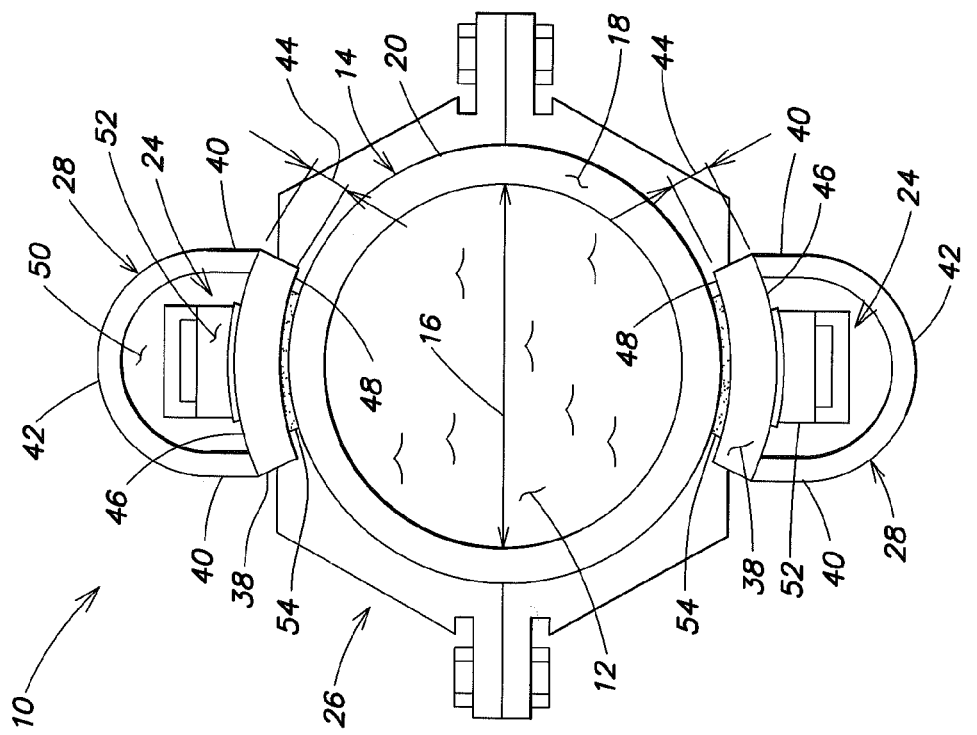

ULTRASONIC FLUID FLOW METER HOUSING WITH ACOUSTICALLY MATCHED BASE

This application claims the benefit of U.S. Provisional Patent Application Ser. No. 61/185,459, filed Jun. 9, 2009.

BACKGROUND OF THE INVENTION

1. Technical Field

This invention relates to devices for sensing fluid flow within a pipe utilizing ultrasonic sensors on pipe walls in general, and to the same which are enclosed to protect said ultrasonic sensors from harsh environments in particular.

2. Background Information

Clamp-on ultrasonic flow meters are a desirable tool for determining characteristics of a fluid flow traveling through a pipe. Ultrasonic flow meters typically include a plurality of ultrasonic sensors, each having a transmitter and a receiver. In some sensor configurations, ultrasonic signals emitted from the transmitters travel through the immediate pipe wall, the fluid flow disposed within the pipe, and through the opposite pipe wall where they are sensed by the receiver portion. The received signal is processed to determine information such as flow velocity, volumetric flow rate, water cut, etc.

Clamp-on fluid flow meters are often used in environments where the signal to noise ratio of the signals sensed by the receivers makes it difficult to accurately distinguish the portion of the signal bearing information relating to the fluid flow, from that which does not; i.e., "noise". Clamp-on fluid flow meters are also sometimes used in extreme environments; e.g., under water environments or those having combustible materials. There is considerable advantage, therefore, in any apparatus or methodology that facilitates the sensing process in a way that improves the signal to noise ratio, and also advantage for any mounting apparatus that allows a clamp-on meter to be used in a harsh environment.

SUMMARY OF THE INVENTION

According to one aspect of the present invention, a device for sensing fluid flow within a pipe, which pipe has a pipe wall, is provided. The device includes a sensor housing and a fluid flow meter. The sensor housing includes at least one pressure vessel enclosure and hardware for mounting the enclosure on an exterior surface of the pipe wall. The enclosure includes a base, side walls, and a cap. The enclosure base has a pipe-side surface that mates with the exterior surface of the pipe wall. The enclosure base and the pipe wall have substantially similar resonant frequencies and acoustic impedance. The sensor housing is adapted to be attached to the pipe wall such that the pipe-side surface of the base is mated with the exterior surface of the pipe wall. The fluid flow meter includes a plurality of ultrasonic sensors disposed within the at least one pressure vessel enclosure. Each sensor has a transmitter and a receiver. The transmitters are adapted to transmit signals at one or more frequencies, including frequencies that are substantially equal to the resonant frequencies of the base and pipe wall.

The present apparatus and advantages associated therewith will become more readily apparent in view of the detailed description provided below, including the accompanying drawings.

BRIEF DESCRIPTION OF THE DRAWINGS

FIG. 1 is a diagrammatic view of a clamp-on system for sensing fluid flow within a pipe.

FIG. 3 is a diagrammatic partial view of a clamp-on system for sensing fluid flow within a pipe.

DETAILED DESCRIPTION OF THE INVENTION

Figure 2:
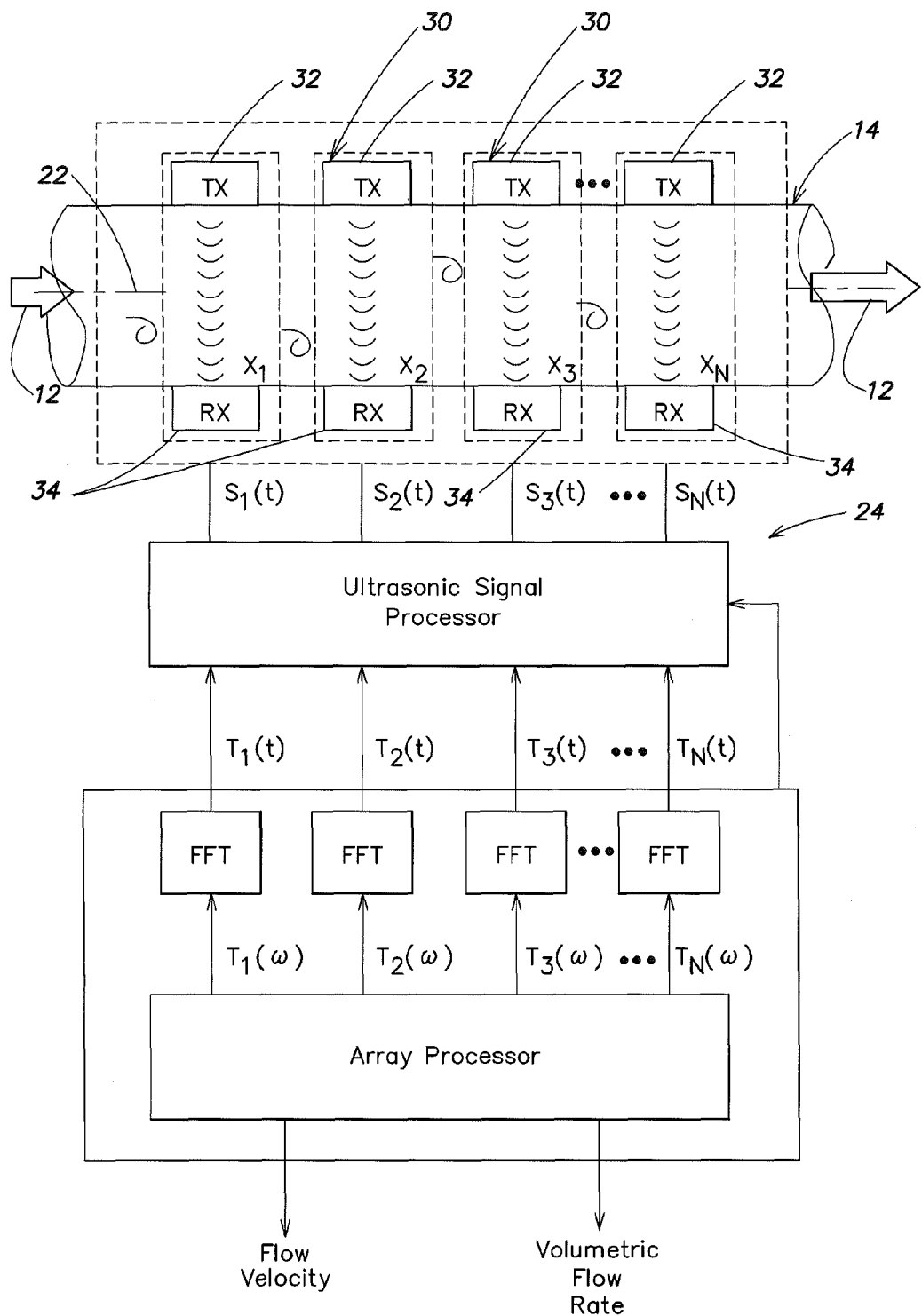
FIG. 2 is a schematic view of a ultrasonic fluid flow meter.

Referring to FIG. 1, a clamp-on system 10 for sensing fluid flow 12 within a pipe 14 is provided. The pipe 14 has a diameter 16, a pipe wall 18, an exterior surface 20, and an axial centerline 22. The system 10 includes a fluid flow meter 24, and a sensor housing 26 having at least one pressure vessel enclosure 28. The housing 26 is adapted to mount the fluid flow meter 24 on the exterior surface 20 of the pipe 14.

The present invention can be used with a variety of different fluid flow meters. An example of an acceptable fluid flow meter 24 is the ultrasonic flow meter described in U.S. Pat. No. 7,389,187, which is hereby incorporated by reference in its entirety. This type of fluid flow meter 24, as shown diagrammatically in FIG. 2, includes an array of at least two ultrasonic sensors 30 disposed axially along the length of a pipe 14. Each ultrasonic sensor 30 comprises a transmitter (TX) 32 and a receiver (RX) 34 pair, and each pair is spaced apart from an adjacent pair by a known distance; e.g., "x" distance. In the embodiment shown in FIGS. 1 and 2, the transmitter 32 and receiver 34 pairs are disposed orthogonally across the pipe 14 aligned with one another. In this configuration, each transmitter 32 is configured to transmit an ultrasonic signal through the pipe 14 in a direction that is normal to the near and far pipe walls 18, and orthogonal to the direction of the fluid flow 12. The opposed receiver 34 is positioned to receive the transmitted signal. The present invention is not limited to use with sensors 30 having orthogonally opposed transmitter-receiver pairs, however, and can be used with alternative sensor configurations such as pitch and catch configurations, pulse echo configurations, and combined transmitter/receiver ultrasonic sensors 30.

The signals $S_1(t)$-$S_N(t)$ produced by the receivers 34 of each ultrasonic sensor 30 are directed to and processed by an ultrasonic signal processor and a signal processor (having an array processor) for determining the velocity of the fluid flow 12 and/or volumetric flow rate. The signal processor includes array processing logic, examples of which include SONAR processing logic and cross-correlation processing logic.

In the embodiment shown in FIG. 1, the sensor housing 26 includes a pair of pressure vessel enclosures 28 and hardware for mounting the enclosures 28 on the exterior surface 20 of the pipe 14. In other embodiments, the sensor housing 26 may only include a single pressure vessel enclosure 28 (e.g., for use with a sensor 30 disposed in a "pitch and catch" configuration). Each pressure vessel enclosure 28 includes a base 38, side walls 40, and a cap 42. The base 38 includes a thickness 44 extending between a sensor-side surface 46 and a pipe-side surface 48. The pipe-side surface 48 of the base 38 is configured to mate with the exterior surface 20 of the pipe wall 18. In the embodiment shown in FIGS. 1 and 3, for example, the pipe-side surface 48 has a curvature that mates with the curvature of the exterior surface 20 of the pipe 14. The side walls 40 and cap 42 attach to the base 38 and are configured to create an internal cavity 50 large enough to enclose at least a portion of the fluid flow meter 24. In the embodiment shown in FIG. 1, for example, one of the pressure vessel enclosures 28 is sized to enclose the transmitter 32 portion of the sensor array, and the other pressure vessel enclosure 28 is sized to enclose the receiver 34 portion of the sensor array. The base 38, side walls 40, and cap 42 portions of each enclosure 28 may be mechanically coupled to one another. In some embodiments the side walls 40 may be integral with either the base 38 or the cap 42.

In all embodiments, the base 38, side walls 40, and cap 42 are attached to one another in a manner that seals the interfaces there between and prevents leakage into or out of the internal cavity. The capacity of the enclosure 28 to prevent fluid leakage into the enclosure 28 can be tailored to the application at hand. For example, in a deep undersea application the sensor housing 26 could be subject to water pressure of up to 5,000 psi. In such applications, each enclosure 28 would be configured to prevent leakage into the enclosure 28 at a predetermined pressure (e.g., leak tight to a difference in pressure across the enclosure 28 of 5000 psi, or some multiplier thereof). In other applications, the enclosure 28 is designed to maintain an elevated pressure within the housing 26. In certain applications, the enclosure 28 is configured to contain elevated pressures that may result from accidental combustion within the enclosure 28, thereby preventing products of combustion from escaping the enclosure 28. This type of configuration has particular utility in those embodiments where combustible materials are present in the environment immediately outside the enclosure 28.

The base 38, side walls 40 and cap 42 of the enclosure 28 can be formed from a variety of materials (e.g., metal, polymer, etc.), and they are not limited to any particular material. The materials for the enclosure 28 are selected to satisfy the needs of the application at hand. As will be described below, the material of the base 38 is preferably selected to have an acoustic impedance that substantially matches the acoustic impedance of the pipe wall 18.

In some embodiments, a shoe 52 is disposed between the sensor transmitter/receiver and the base 38. In the embodiment shown in FIGS. 1 and 3, for example, a shoe 52 is disposed between both the sensor transmitters 32 and the associated enclosure base 38, and the receivers 34 and the associated enclosure base 38. The shoes 52 are operable to act as a signal guide between the sensor and the base 38 of the enclosure 28. The shoe 52 is typically shaped to mate with the sensor side surface geometry of the enclosure base 38 to create a uniform interface between the shoe 52 and the base 38.

Both the enclosure base 38 and the pipe wall 18 have characteristic resonant frequencies and acoustic impedance. The resonant frequencies of each are a function of both the material and thickness of the respective enclosure base 38 and pipe wall 18. In preferred embodiments, the material and thickness of the enclosure base 38 is selected to produce a base 38 having resonant frequencies that substantially match those of the pipe wall 18 for the particular application at hand. Also in preferred embodiments, the material of the base 38 and the material of the pipe wall 18 have the same or similar acoustic impedance values; e.g., the speed of sound through each material ($a_{sos}$) is approximately the same for each material.

In a preferred embodiment of the present invention, the transmitters 32 are adapted to transmit signals at one or more frequencies, including frequencies that are substantially equal to the resonant frequencies of the enclosure base 38 and pipe wall 18. The quality of the information from the fluid flow meter 24 depends, in large part, upon the signal to noise ratio associated with the sensor 30. Anything that increases the signal to noise ratio (e.g., increases the desired signal component relative to undesired signal component) is advantageous because it facilitates identification of the desirable signal (i.e., the signal bearing information regarding the fluid flow 12) and the production of fluid flow 12 information from the signal.

In some embodiments, as shown in FIG. 3, a layer of couplant 54 is disposed between the pipe-side surface 48 of the base 38 and the exterior surface 20 of the pipe 14. An example of an acceptable couplant 54 is an adhesive such as Loctite® Hysol® 9460™ brand epoxy adhesive commercially offered by the Henkel Corporation. The present invention is not limited to this type of adhesive, however. The layer of couplant 54 has a dimension referred to herein as its "thickness", which extends between and is normal to the enclosure base 38 and the pipe wall 18; i.e., the distance the signals must traverse through the couplant 54. In certain embodiments, the thickness of the couplant 54 disposed between the pipe wall 18 and the enclosure base 38 is "thin", and has negligible effect on the signals passing therethrough. In these embodiments, the pipe wall 18 and the enclosure base 38 can be acoustically considered to be a single structure because of the thin couplant 54 layer and because the sound speed through the pipe wall 18 material and through the base 38 are approximately equal. Under this model, the following equation can be used to determine frequencies of maximum transmissibility (e.g., resonant frequencies):

$$f = n\frac{a_{SOS}}{2t} \qquad (\text{Eqn. 1})$$

where n is an integer equaling 1, 2, 3, etc.; $a_{sos}$ is the sound speed through the pipe wall 18 and base 38, and t is the combined thickness of the pipe wall 18 and the enclosure base 38. A couplant 54 is "acoustically thin" when the following expression is satisfied:

$$\frac{t_{couplant}f}{a_{couplant}} \ll 1 \qquad (\text{Eqn. 2})$$

Here, $t_{couplant}$ is the thickness of the couplant 54, f is the frequency of the transmitted ultrasonic signal, and $a_{couplant}$ is the speed of sound of the couplant 54.

Referring to FIG. 1, in other embodiments of the present invention the enclosure base 38 and the pipe wall 18 also have approximately equal sound speed values. In these embodiments, however, the thickness of the layer of couplant 54 disposed between the pipe-side surface 48 of the enclosure base 38 and the exterior surface 20 of the pipe wall 18 is substantially greater than the above-described "thin" layer. The thickness of the couplant 54 layer is such that the enclosure base 38 and the pipe wall 18 cannot be considered to be a single structure. In these embodiments, the signals between the transmitter and receiver must pass through a shoe 52 (in most applications), the enclosure base 38, the "thick" couplant 54 layer, the pipe wall 18, and then the fluid flow 12 within the pipe before reaching the mirror configuration on the opposite side. This "stack of layers" is such that the signal will encounter, in relative terms, a low acoustical impedance layer (i.e., the shoe 52), a high acoustical impedance layer (i.e., the enclosure base 38), a low acoustical impedance layer (i.e., the "thick" couplant 54), a high acoustical impedance layer (i.e., the pipe wall 18), and then a low acoustical impedance layer (i.e., the fluid flow 12). For enhanced signal transmissibility, the three inner layers (enclosure base 38, thick couplant 54 layer, pipe wall 18) should be chosen such that Equation 1 provided above holds true. Regarding the enclosure base 38 and the pipe wall 18, the manner in which Equation 1 will hold true is described above. In terms of the thick layer of couplant 54, the frequencies can be dictated by the pipe wall 18 and enclosure base 38. The couplant 54 can then be chosen having properties such as a speed of sound ($a_{sos}$) that will work for the application at hand given a particular thickness ("t") of the couplant 54 layer:

$$t = n\frac{a_{SOS}}{2f} \quad \text{(Eqn. 3)}$$

As an example, assume a particular application has a pipe wall 18 with a thickness of 1 cm and is made from a material having a sound speed of 5000 m/sec. In such an application, an enclosure base 38 can be selected that is made from material also having a sound speed of 5000 m/sec and a thickness of 1 cm. Using Equation 1 above, the excitation frequency associated with n=2 can then be calculated (i.e., 500 kHz).

If a couplant 54 is chosen that has a sound speed of 1500 m/sec, the thickness of the couplant 54 layer associated with an excitation frequency of 500 kHz and n=1 can then be determined using Equation 3 above (i.e., 0.15 cm).

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed herein as the best mode contemplated for carrying out this invention.

What is claimed is:

1. A device for sensing fluid flow within a pipe, which pipe has a pipe wall, comprising:
    a sensor housing having at least one pressure vessel enclosure and hardware for mounting the enclosure on an exterior surface of the pipe wall, which enclosure includes a base, side walls, and a cap, wherein the base has a pipe-side surface that mates with the exterior surface of the pipe wall, and wherein the base and the pipe wall have substantially similar resonant frequencies and acoustic impedance, which sensor housing is adapted to be attached to the pipe wall such that the pipe-side surface of the base is mated with the exterior surface of the pipe wall; and
    a fluid flow meter having plurality of ultrasonic sensors disposed within the at least one pressure vessel enclosure, each sensor having a transmitter and a receiver, wherein the transmitters are adapted to transmit signals at one or more frequencies including frequencies that are substantially equal to the resonant frequencies of the base and pipe wall.

2. The device according to claim 1 wherein a layer of couplant having a thickness is disposed between the pipe-side surface of the base and the exterior surface of the pipe wall.

3. The device according to claim 2, wherein the thickness of the couplant layer is such that the pipe wall and the base can be acoustically considered to be a single layer of material.

4. The device according to claim 3, such that both the pipe wall and the enclosure base are defined by the following expression for a given set of frequencies:

$$f = n\frac{a_{SOS}}{2t}$$

wherein f is a frequency within the given set of frequencies, n is an integer, $a_{sos}$ is a speed of sound through the pipe wall, and t is the thickness of the couplant layer.

5. The device according to claim 2, wherein the thickness of the couplant layer is such that the pipe wall and the base cannot be acoustically considered to be a single layer of material.

6. The device according to claim 5, such that the pipe wall, the couplant layer, and the enclosure base are defined by the following expression for a given set of frequencies:

$$f = n\frac{a_{SOS}}{2t}$$

wherein f is a frequency within the given set of frequencies, n is an integer, $a_{sos}$ is a speed of sound through the pipe wall, and t is the thickness of the couplant layer.

7. The device according to claim 6, wherein the sensor housing includes a pair of pressure vessel enclosures, and the hardware is adapted to mount the enclosures orthogonally opposite one another across the pipe.

8. The device according to claim 7, wherein the pair of pressure vessel enclosures includes a first enclosure sized to receive the receivers of the sensors, and a second enclosure sized to receive the transmitters of the sensors, and the hardware is adapted to mount the first and second enclosures orthogonally opposite one another across the pipe such that signals transmitted normal to the pipe wall from the transmitters are received by the receivers.

9. The device according to claim 8, wherein the first and second pressure vessels are fluid leak tight to a difference in pressure across the enclosure of 5000 psi or less.

10. The device according to claim 1, wherein the sensor housing includes a pair of pressure vessel enclosures, and the hardware is adapted to mount the enclosures orthogonally opposite one another across the pipe.

11. The device according to claim 10, wherein the pair of pressure vessel enclosures includes a first enclosure sized to receive the receivers of the sensors, and a second enclosure sized to receive the transmitters of the sensors, and the hardware is adapted to mount the first and second enclosures orthogonally opposite one another across the pipe such that signals transmitted normal to the pipe wall from the transmitters are received by the receivers.

12. The device according to claim 11, wherein the first and second pressure vessels are fluid leak tight to a difference in pressure across the enclosure of 5000 psi or less.

13. The device according to claim 1, wherein the resonant frequency of the base is a function of a material and a thickness of the base, and wherein the resonant frequency of the pipe wall is a function of a material and a thickness of the pipe wall.

* * * * *